United States Patent [19]
Jones et al.

[11] Patent Number: 5,628,436
[45] Date of Patent: May 13, 1997

[54] SADDLEBAG WITH REMOVABLE INSULATED LINER

[75] Inventors: Cary Jones; Carolyn Kemp, both of Acworth; Doug Ackerman, Calhoun, all of Ga.

[73] Assignee: Trails End Western Apparel, Inc., Acworth, Ga.

[21] Appl. No.: 496,057

[22] Filed: Jun. 28, 1995

[51] Int. Cl.⁶ .................................................. B62J 9/00
[52] U.S. Cl. .................. 224/148.3; 54/37.1; 224/609; 224/430; 224/905
[58] Field of Search .............. 224/148.3, 148.7, 224/602, 609, 42.11, 429, 430, 905; 54/37.1

[56] References Cited

U.S. PATENT DOCUMENTS 3,903,944  9/1975  Montgomery et al. ............... 224/430
4,258,869  3/1981  Hilgendorff ............................ 224/905
5,216,900  6/1993  Jones ............................. 224/148.3 X

*Primary Examiner*—Renee S. Luebke
*Attorney, Agent, or Firm*—John L. James

[57] ABSTRACT

A pair of saddlebags has a unibody construction provided by an elongated, single piece, base panel that forms the wide sides of the saddlebags that rest on the horse and forms the entry side of the saddlebags. A removable liner contains rigid insulation to help retain the shape of the saddlebags as it maintains an even temperature inside the saddlebags. The lids of the saddlebags are biased to be self closing. Extra storage pouches are formed on the smaller side panels of the saddlebags and a carrying and storage handle is sewn onto the base panel and into the individual saddlebags.

19 Claims, 3 Drawing Sheets

SADDLEBAG WITH REMOVABLE INSULATED LINER

FIELD OF THE INVENTION

The present invention relates generally to a saddlebag, and, more particularly, to a utility saddlebag for transporting hot and cold items.

BACKGROUND OF THE INVENTION

Saddlebags are used by horsemen to transport various items including food and beverages during recreational and other activities. During warm weather horses sweat even when walking at slow speeds. Saddlebags are exposed to the sweat and must be periodically cleaned to prevent mildew growth and to maintain a nonoffensive odor. Leather saddlebags are expensive to clean and maintain and are being replaced with fabric saddlebags that can be more easily cleaned. Unfortunately, after cleaning, fabric saddlebags do not retain their shape, have diminished volume and are unsightly. It is desirable to have a saddlebag that retains its appearance, volume and shape after cleaning, and that is easily cleaned.

Because many activities occur during warm weather and last for several hours, saddlebags are used to transport beverages and sometimes food. Conventional leather and fabric saddlebags are ineffective in maintaining the temperature of cold beverages. Accordingly, it will be appreciated that it would be highly desirable to have a saddlebag that maintains the temperature of the items transported.

SUMMARY OF THE INVENTION

The present invention is directed to overcoming one or more of the problems set forth above. Briefly summarized, according to one aspect of the present invention, a saddlebag comprises an elongated base panel having front and rear edge portions, left and right end portions, and a middle portion intermediate the left and right end portions; a front edge panel having a bottom portion attached to said front edge portion and said left end portion of said base panel, and a top portion free of connection to said base panel; a rear edge panel having a bottom portion attached to the rear edge portion and the left end portion of the base panel, and a top portion free of connection to the base panel, the base panel, front edge panel and rear edge panel forming a left pouch with sidewalls and a bottom; and a liner removably attached in the left pouch along the sidewalls and the bottom, the liner having pockets along the sidewalls and the bottom for receiving rigid insulation.

When constructed of a material such as denim, the saddlebag tends to retain its appearance after cleaning, and denim can be preshrunk before construction of the saddlebag to retain its volume. In addition to temperature control, rigid insulation ensures that the saddlebag will maintain its shape after cleaning.

According to another aspect of the invention, a pair of saddlebags comprises an elongated base panel having left and right end portions, and a middle portion intermediate the left and right end portions; a left saddlebag attached to the left end portion of the base panel; a left lid hingedly connected to the base member for coveting the left saddlebag; a left hook and loop fastener releasably connecting the left lid and left saddlebag; a right saddlebag attached to the right end portion of the base panel; a right lid hingedly connected to the base member for covering the right saddlebag; a right hook and loop fastener releasably connecting the right lid and right saddlebag; a left liner removably attached in the left saddlebag for receiving rigid insulation; and a right liner removably attached in the right saddlebag for receiving rigid insulation.

The saddlebags use a single piece of material for the base panel for strength and ease of construction. Because the rigid insulation maintains the shapes of the bags and their lids, there is perfect closure at all times. The weight the lid biases the lid closed so that the lid is self closing.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
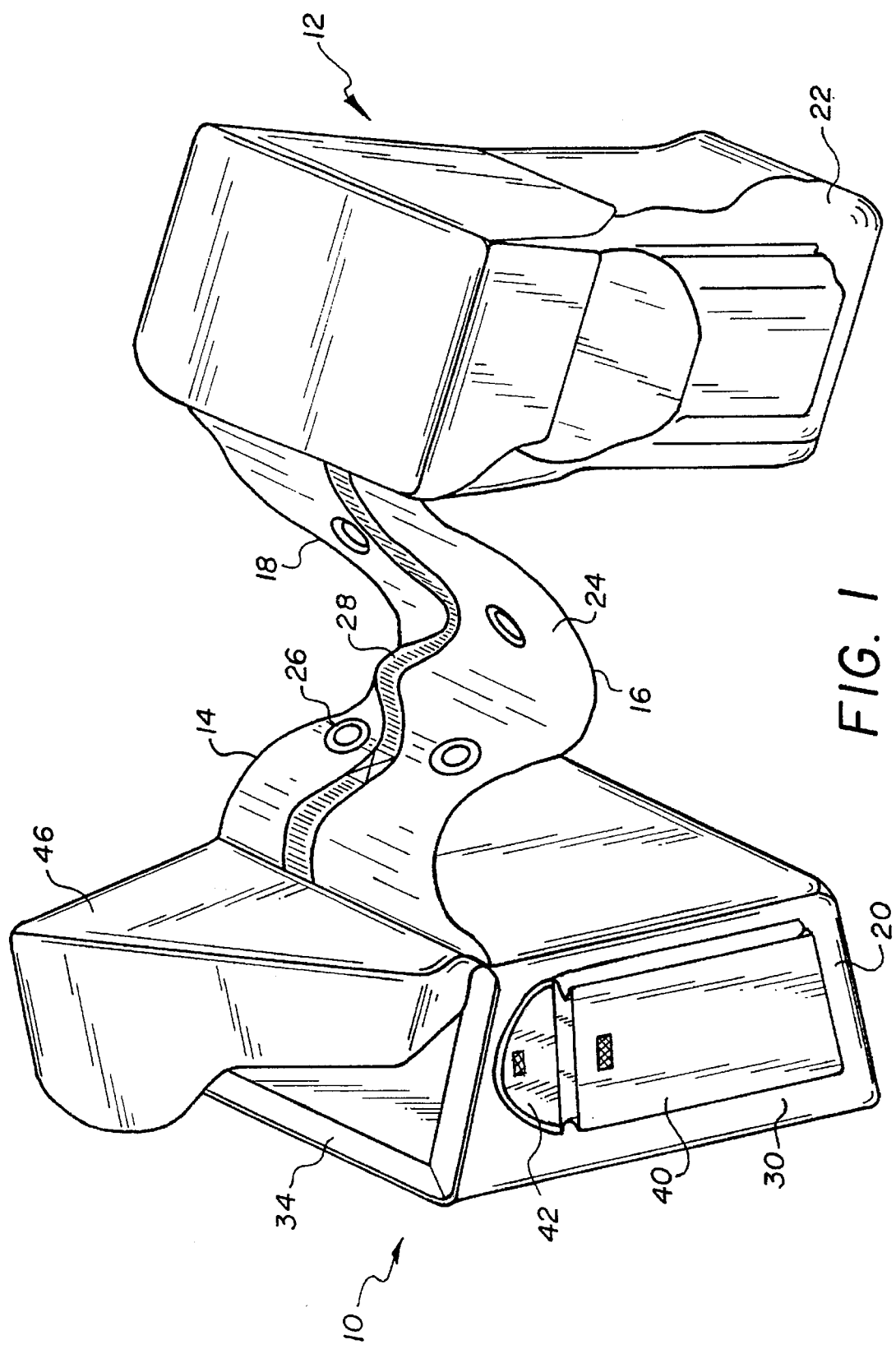
FIG. 1 is a diagrammatic rear perspective view of a preferred embodiment of a pair of saddlebags with removable insulated liners according to the present invention.
Figure 2:
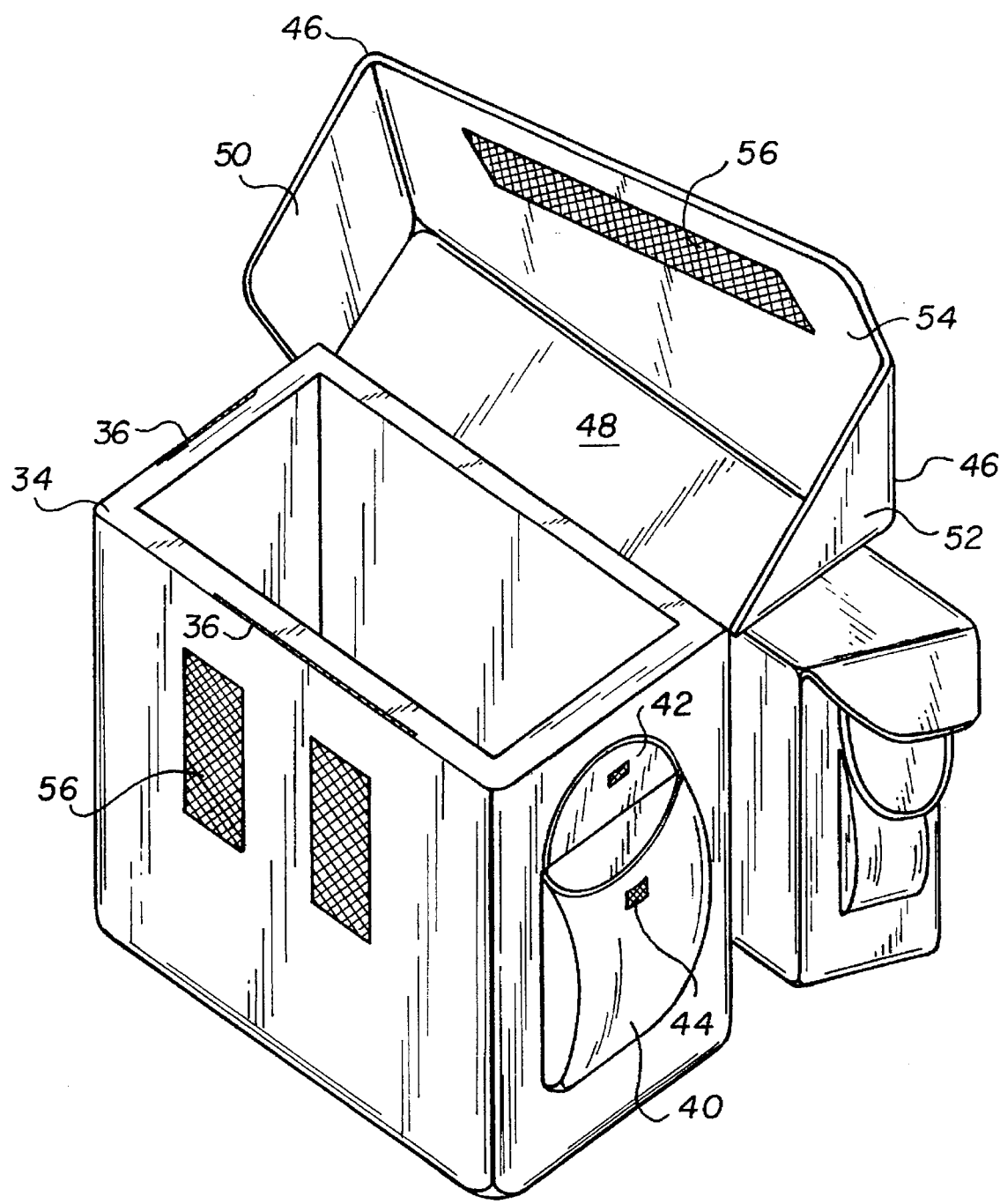
FIG. 2 is a diagrammatic left side perspective view of the saddlebags of FIG. 1 with the lid of the left saddlebag open.
Figure 3:
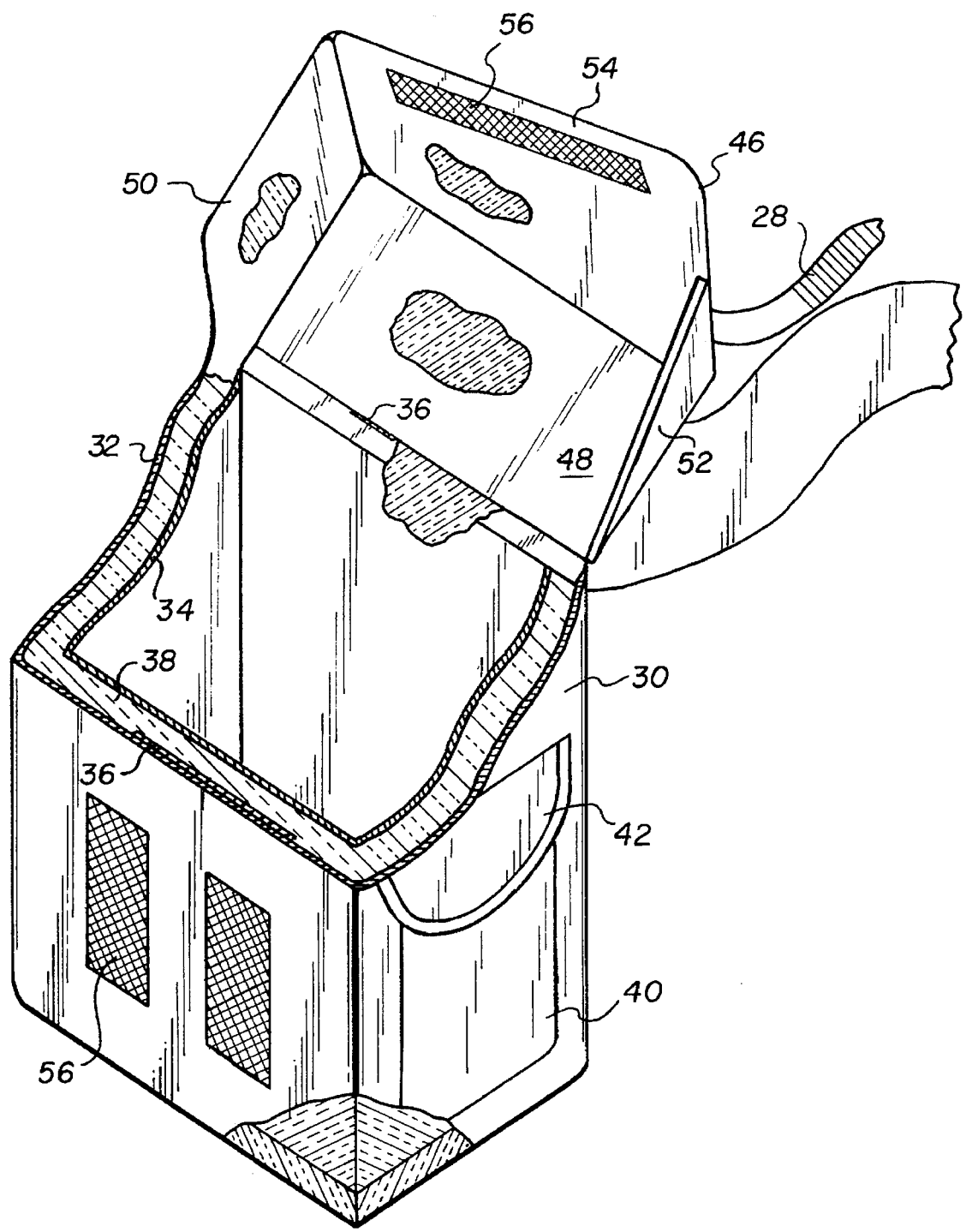
FIG. 3 is a perspective view of the left saddlebag with a portion cut away to reveal the removable liner and rigid insulation.

Referring to FIGS. 1–3, a pair of saddlebags includes a left saddlebag 10 and a right saddlebag 12 that are identical to one another. The description herein will focus on the left saddlebag 10 but it is to be understood that the same description applies to the right saddlebag as well. A common elongated base panel 14 joins the left and right saddlebags 10, 12. The base panel has front and rear edge portions 16, 18, left and right end portions 20, 22 and a middle portion 24 intermediate the left and right end portions 20, 22. Middle portion 24 extends between the left and right saddlebags 10, 12 and contains grommets, preferably metal 26, with openings for hanging the saddlebags on storage hooks when not in use. Middle portion 24 also contains a handle 28 formed by sewing a piece of reinforcing material to the base panel 14 except along a certain span to form an opening between the reinforcing material and the base panel 14. The opening provides a space for the hand to grasp the reinforcing material of the handle 28, and, when not being used as a carrying handle, provides a storage place for rolled blankets, jackets and the like. Ideally, the reinforcing material extends along the middle portion 24 towards the left and right end portions 20, 22 into the left and right saddlebags 10, 12 so that the reinforcing material absorbs the saddlebag load.

The left saddlebag 10 is formed by folding the left end portion 20 of the base panel 14 into an open box or U-shape wherein the legs of the U become the outside and inside panels of the left saddlebag and the bottom of the U becomes the bottom panel of the saddlebag. The inside panel is adjacent the middle portion 24 and will rest against the horse while the outside panel is removed from contact with the horse by the depth or lateral dimension of the saddlebag.

A front edge panel 30 has a bottom portion attached to the front edge portion 16 of the base panel 14 and connected to the left end portion 20 of the base panel 14, and it has a top portion that is free of connection to the base panel. A rear edge panel 32 has a bottom portion attached to the rear edge portion 18 of the base panel 14 and connected to the left end portion 20 of the base panel 14, and it has a top portion that is free of connection to the base panel. By this construction, a regular rectilinear box structure is formed which is the preferred configuration for many applications. If another configuration is desired, the left end portion of the base panel could be folded into another shape, such as a triangular or V-shape for example. The base panel 14, front edge panel 30 and rear edge panel 32 form a left bag portion of the saddlebag with sidewalls and a bottom.

A liner 34 is removably attached in the left bag along the sidewalls and bottom. Hook and loop fasteners 36 positioned near the top or open end of the bag are well suited for removably fastening the liner 34. The liner preferably has pockets formed along the sidewalls and the bottom of a size sufficient for receiving pieces of rigid insulation 38. Alternatively, rigid insulation could be positioned between the liner and sidewalls and bottom of the bag but a pocketed liner is preferred. The rigid insulation 38 is preferred because it helps the saddlebag maintain its shape. Material for the liner 34 may be a moisture proof fabric or material to protect the saddlebag from condensation formed on the contents of the saddlebag and to isolate the contents from horse perspiration. A moisture proof liner will also help keep the insulation dry and fresh smelling.

Additional storage may be provided by a storage pouch formed by a first panel 40 attached to the front edge panel 30 forming a storage pouch area between the front edge panel and the first panel. A second panel 42 attached to the front edge panel 30 forms a cover flap for the storage pouch that may be kept closed with a hook and loop fastener 44. One of these storage pouches may also be positioned on the rear edge panel 32.

A lid 46 has a top panel 48 attached to the base panel 14 by stitching or the like to form a hinged connection, side panels 50, 52 attached to the top panel 48, and a front panel 54 attached to the side panels 50, 52 and the top panel 48. The lid panels form an open boxy structure that fits over the bag portion of the saddlebag. The lid 48 is insulated with rigid insulation and may have a liner similar to liner 34. The lid has a center of gravity and moves between a closed position at which the front panel 54 and side panels 50, 52 overlap the sidewalls of the bag portion of the saddlebag, and an open position at which the center of gravity biases the lid toward the closed position. When positioned on a horse, the opening motion of the lid is restrained by contact with the base member which is in direct contact with the horse so that the center of gravity urges the lid toward the closed position. This makes the lid self closing to minimize exposure of the contents to ambient temperature. Hook and loop fasteners 56 releasably connect the lid and bag to keep the lid closed.

Operation of the present invention is believed to be apparent from the foregoing description and drawings, but a few words will be added for emphasis. The self closing lid must be held open to access the contents of the saddlebag. When open, the liner may be removed along with the insulation for easy cleaning of the liner and the bag portion of the saddlebag. With the insulation removed, the liners and saddlebags can be hosed down and air dried or the liner can be cleaned in a washing machine and dried in a drying machine. Denim tends to retain its shape and the rigid insulation guarantees shape retention.

It can now be appreciated that a pair of insulated saddlebags has been presented. The pair of insulated saddlebags contain an elongated base panel with left and right end portions, and a middle portion intermediate the left and right end portions. A left saddlebag is attached to the left end portion of the base panel and a left lid is hingedly connected to the base member for covering the left saddlebag. A left hook and loop fastener releasably fastens the left lid and left saddlebag. A left liner that is removably attached in the left saddlebag has pockets for receiving rigid insulation. A right saddlebag is attached to the right end portion of the base panel and a right lid is hingedly connected to the base member for covering the right saddlebag. A right hook and loop fastener releasably fastens the right lid and right saddlebag. A right liner that is removably attached in the right saddlebag has pockets for receiving rigid insulation.

Each of the lids has a center of gravity and moves between a closed position at which the lid overlap and closes one of the saddlebags and an open position at which the center of gravity biases the lid toward the closed position so that the lid is self closing. Each saddlebag has front and rear panels and includes a first pouch panel attached to the front panel forming a storage pouch between the front panel and the first pouch panel. A cover flap is attached to the front panel for closing the storage pouch. A second pouch panel is also attached to the rear panel forming a storage pouch between the rear panel and the second pouch panel. A carrying handle attached to the middle portion of the base panel to extend from one saddlebag to the other also defines an opening therebetween for storage of a blanket roll or the like.

The insulated saddlebags can be washed in a washing machine or by hand and are therefore inexpensive to clean and easy to maintain. When constructed of preshrunk denim, they retain their shape and appearance and do not suffer diminished volume. Unlike conventional leather and fabric saddlebags, the insulated saddlebags effectively maintain the temperature of cold beverages or other transported items. In addition, denim is a very strong material. In a test, the saddlebags were draped over a horse and a rider, who weighed in excess of two hundred pounds, stood on the horse with a foot in each saddlebag without injury to the horse or saddlebags.

While the invention has been described with particular reference to the preferred embodiments, it will be understood by those skilled in the art that various changes may be made and equivalents may be substituted for elements of the preferred embodiments without departing from invention. For example, while denim has been described other material could be used, and while sewing has been described to attached one piece of material to another, other methods can be used. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, the invention has been described by using rigid insulation, but nonrigid insulation can be used where the shape will not suffer. Packets of material that are cold, or hot depending on the items transported, can be placed in the pockets for greater temperature control. It is accordingly intended that the claims shall cover all such modifications and applications as do not depart from the hue spirit and scope of the invention.

What is claimed is:

1. A saddlebag, comprising:
   an elongated base panel having front and rear edge portions, left and right end portions, and a middle portion intermediate said left and right end portions;

a front edge panel having a bottom portion attached to said front edge portion and said left end portion of said base panel, and a top portion free of connection to said base panel;

a rear edge panel having a bottom portion attached to said rear edge portion and said left end portion of said base panel, and a top portion free of connection to said base panel, said base panel, front edge panel and rear edge panel forming a left bag with sidewalls and a bottom; and a liner removably attached in said left bag along said sidewalls and said bottom, said liner having pockets along said sidewalls and said bottom for receiving rigid insulation.

2. A saddlebag, as set forth in claim 1, wherein said base panel is a single piece of material.

3. A saddlebag, as set forth in claim 1, including a handle attached to said middle portion of said base panel defining an opening therebetween for storage.

4. A saddlebag, as set forth in claim 1, including a first panel attached to said front edge panel forming a storage pouch between said front edge panel and said first panel.

5. A saddlebag, as set forth in claim 4, including a second panel attached to said front edge panel forming a cover flap for said pouch.

6. A saddlebag, as set forth in claim 4, including a lid having a top panel attached to said base panel, side panels attached to said top panel, and a front panel attached to said side panels and said top panel.

7. A saddlebag, as set forth in claim 6, wherein said lid is insulated with rigid insulation.

8. A saddlebag, as set forth in claim 6, wherein said lid has a center of gravity and wherein said lid is hingedly connected to said base member and moves between a closed position at which said front and side panels of said lid overlap said sidewalls of said bag and an open position at which said center of gravity biases said lid toward the closed position.

9. A saddlebag, as set forth in claim 8, including a hook and loop fastener releasably connecting said lid and bag.

10. A pair of saddlebags, comprising:

an elongated base panel formed of a single piece of material and having front and rear edge portions, left and right end portions, and a middle portion intermediate said left and right end portions;

a left front edge panel having a bottom portion attached to said front edge portion and said left end portion of said base panel, and a top portion free of connection to said base panel;

a left rear edge panel having a bottom portion attached to said rear edge portion and said left end portion of said base panel, and a top portion free of connection to said base panel, said base panel, left front edge panel and left rear edge panel forming a left bag with sidewalls and a bottom;

a left liner removably attached in said left bag along said sidewalls and said bottom, said left liner having pockets along said sidewalls and said bottom for receiving insulation;

a right front edge panel having a bottom portion attached to said front edge portion and said right end portion of said base panel, and a top portion free of connection to said base panel;

a right rear edge panel having a bottom portion attached to said rear edge portion and said right end portion of said base panel, and a top portion free of connection to said base panel, said base panel, right front edge panel and right rear edge panel forming a right bag with sidewalls and a bottom; and a right liner removably attached in said right bag along said sidewalls and said bottom, said right liner having pockets along said sidewalls and said bottom for receiving insulation.

11. A pair of saddlebags, as set forth in claim 10, including a left lid for said left bag, said left lid having a top panel attached to said base panel, side panels attached to said top panel, and a front panel attached to said side panels and said top panel.

12. A pair of saddlebags, as set forth in claim 11, wherein said lid is insulated with rigid insulation.

13. A pair of saddlebags, as set forth in claim 11, wherein said left lid has a center of gravity and wherein said left lid is hingedly connected to said base member and moves between a closed position at which said front and side panels of said left lid overlap said sidewalls of said left bag and an open position at which said center of gravity biases said left lid toward the closed position.

14. A pair of saddlebags, comprising:

an elongated base panel having left and right end portions, and a middle portion intermediate said left and right end portions;

a left saddlebag attached to said left end portion of said base panel;

a left lid hingedly connected to said base member for covering said left saddlebag;

a left hook and loop fastener releasably connecting said left lid and left saddlebag;

a right saddlebag attached to said right end portion of said base panel;

a right lid hingedly connected to said base member for coveting said right saddlebag;

a right hook and loop fastener releasably connecting said right lid and right saddlebag;

a left liner removably attached in said left saddlebag and having pockets for receiving rigid insulation; and a right liner removably attached in said right saddlebag and having pockets for receiving rigid insulation.

15. A saddlebag, as set forth in claim 14, including a handle attached to said middle portion of said base panel defining an opening therebetween for storage.

16. A saddlebag, as set forth in claim 14, wherein each of said lids has a center of gravity and moves between a closed position at which said lid overlap and closes one of said saddlebags and an open position at which said center of gravity biases said lid toward the closed position.

17. A saddlebag, as set forth in claim 14, wherein said left saddlebag has front and rear panels and including a first pouch panel attached to said front panel forming a storage pouch between said front panel and said first pouch panel.

18. A saddlebag, as set forth in claim 17, including a second pouch panel attached to said rear panel forming a storage pouch between said rear panel and said second pouch panel.

19. A saddlebag, as set forth in claim 17, including a cover flap attached to said front panel for closing said storage pouch.

* * * * *